(12) United States Patent
Huang et al.

(10) Patent No.: US 11,031,030 B1
(45) Date of Patent: Jun. 8, 2021

(54) AUTOMATIC TONEARM LIFTER

(71) Applicants: YA HORNG ELECTRONIC CO., LTD., Tainan (TW); THORENS GMBH, Bergisch-Gladbach (DE)

(72) Inventors: Jin-Yi Huang, Tainan (TW); Gunter Kuerten, Bergisch-Gladbach (DE)

(73) Assignees: YA HORNG ELECTRONIC CO., LTD., Tainan (TW); THORENS GMBH, Bergisch-Gladbach (DE)

( * ) Notice: Subject to any disclaimer, the term of this patent is extended or adjusted under 35 U.S.C. 154(b) by 0 days.

(21) Appl. No.: 17/016,929

(22) Filed: Sep. 10, 2020

(30) Foreign Application Priority Data

Dec. 31, 2019 (TW) .................................. 108148705

(51) Int. Cl.
*G11B 3/08* (2006.01)
*G11B 3/085* (2006.01)
*G11B 3/38* (2006.01)

(52) U.S. Cl.
CPC ........ *G11B 3/08516* (2013.01); *G11B 3/0857* (2013.01); *G11B 3/38* (2013.01)

(58) Field of Classification Search
CPC ...... G11B 3/08516; G11B 3/0857; G11B 3/38

USPC ......................................... 369/230, 220, 225
See application file for complete search history.

(56) References Cited

U.S. PATENT DOCUMENTS

| 4,170,359 A | * | 10/1979 | Leech | .................... | G11B 17/16 |
| | | | | | 369/209 |
| 2007/0008868 A1 | * | 1/2007 | Riggle | .................... | G11B 3/31 |
| | | | | | 369/245 |

* cited by examiner

*Primary Examiner* — Allen T Cao
(74) *Attorney, Agent, or Firm* — Burris Law, PLLC

(57) ABSTRACT

An automatic tonearm lifter for use in a turntable that includes a main body and a tonearm rotatably mounted on the main body. The tonearm lifter includes a casing adapted to be fixedly mounted to the main body of the turntable, a lifting unit adapted to be mounted to the main body, adapted for supporting the tonearm, movable relative to the casing along a vertical axis, and non-rotatable about the axis relative to the casing, and a rotating unit including a threaded seat that is rotatable about the axis and that is threadably engaging the lifting unit, and a driving module that is connected to the threaded seat and that is operable to drive rotation thereof, thereby moving the lifting unit along the axis.

12 Claims, 6 Drawing Sheets

AUTOMATIC TONEARM LIFTER

CROSS-REFERENCE TO RELATED APPLICATION

This application claims priority of Taiwanese Patent Application No. 108148705, filed on Dec. 31, 2019.

FIELD

The disclosure relates to a lifting device, and more particularly to an automatic tonearm lifter.

BACKGROUND

A conventional turntable for a phonograph record disc includes a main body, a rotating platform, and a tonearm rotatably mounted on the main body. The record disc is inscribed with a modulated spiral groove that starts near the periphery and ends near the center of the record disc. The tonearm includes a stylus needle adapted for sliding along the spiral groove on the record disc, reading musical tracks thereon.

When using a turntable, the stylus needle is initially disposed at the periphery of the record disc. Then, as the record disc rotates during the operation of the turntable via the rotating platform, the stylus needle slides along the spiral groove of the record disc and moves toward the center of the record disc, thereby reading and playing the musical tracks and driving rotation of the tonearm along the way. Once the tonearm is moved to a predetermined position, where the stylus needle has moved to the center of the record disc and has reached the end of the musical tracks, the turntable stops. Afterward, in order to move the stylus needle away from the rotating platform, the tonearm is manually lifted away from the rotating platform and placed on a tonearm lifter, which is manually operated via an adjustment switch.

However, if a user is not present to manually lift the tonearm after the musical tracks have finished playing, the stylus needle would remain to be in contact with the spiral groove of the record disc for a prolonged period of time, which can potentially damage and deteriorate the quality of both the stylus needle and the record disc.

SUMMARY

Therefore, an object of the disclosure is to provide an automatic tonearm lifter that can alleviate the drawback of the prior art.

According to the disclosure, the automatic tonearm lifter is adapted for use in a turntable, and includes a main body, and a tonearm that is rotatably mounted on the main body. The automatic tonearm lifter includes a casing, a lifting unit, and a rotating unit. The casing is adapted to be fixedly mounted to the main body of the turntable. The lifting unit is mounted to the casing, is adapted for supporting the tonearm, is movable relative to the casing along a vertical axis, and is non-rotatable about the axis relative to the casing. The rotating unit includes a threaded seat that is rotatable about the axis, and that is threadably engaging the lifting unit, and a driving module that is connected to the threaded seat and that is operable to drive rotation thereof, thereby moving the lifting unit along the axis.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
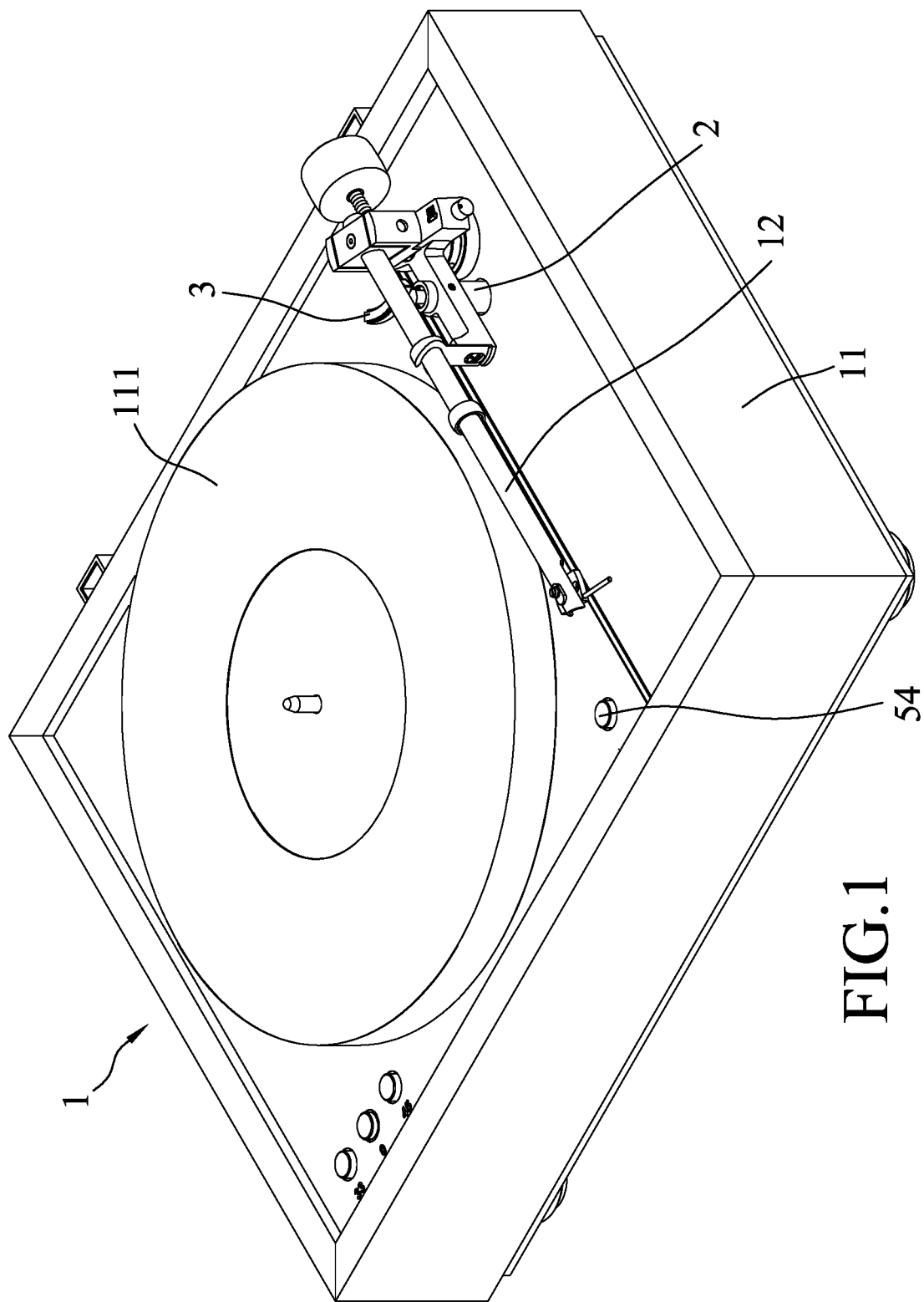
FIG. 1 is a perspective view of a turntable and an embodiment of an automatic tonearm lifter according to the disclosure.
Figure 2:
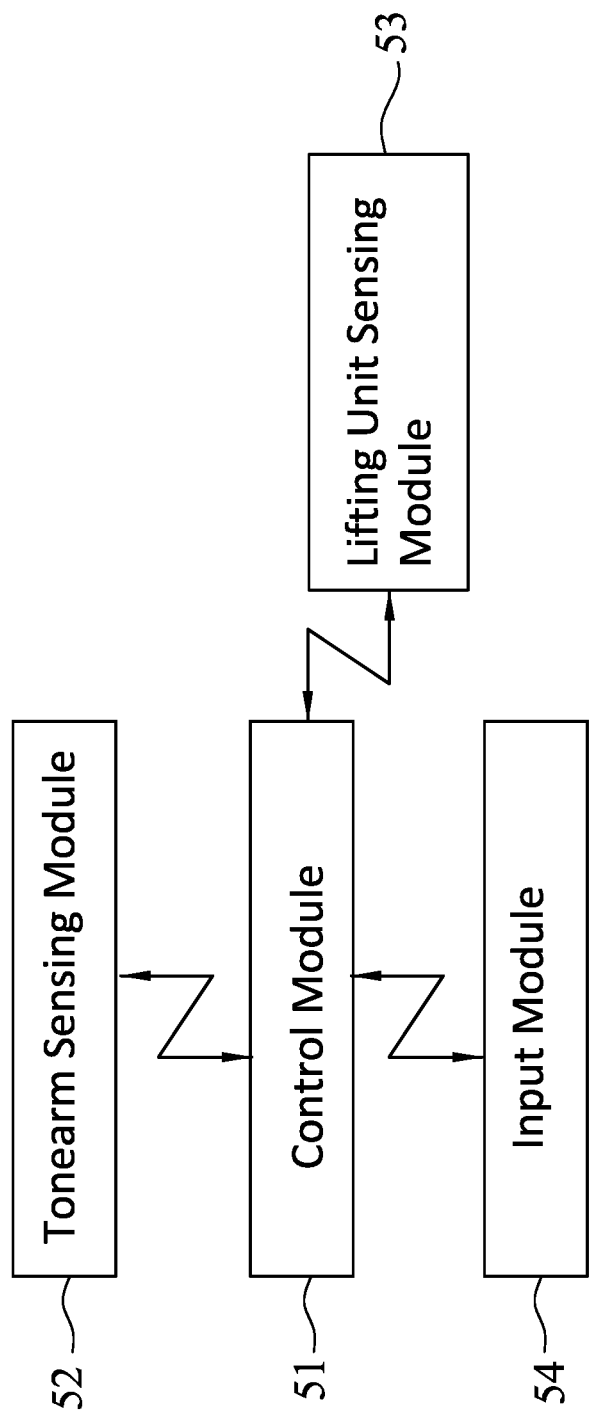
FIG. 2 is a block diagram illustrating a control unit of the embodiment.
Figure 3:
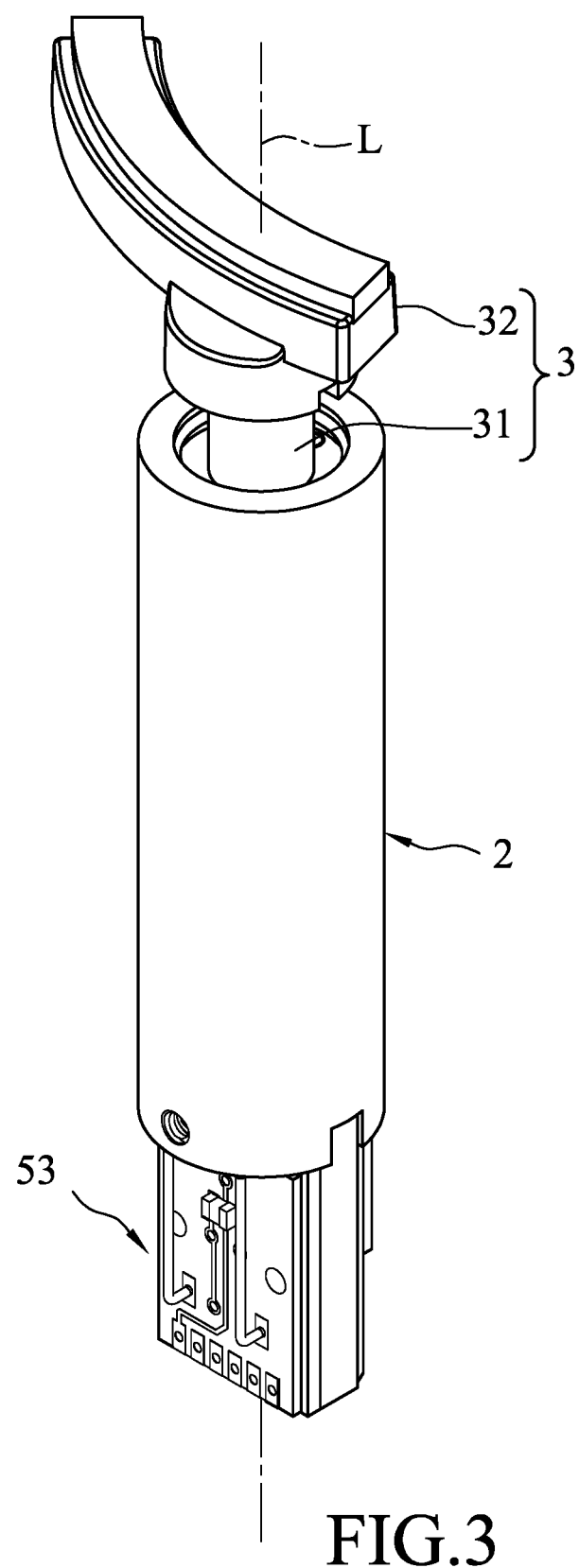
FIG. 3 is a perspective view of the embodiment, illustrating a casing unit, a lifting unit, and a lifting unit sensing module of the control unit thereof.
Figure 4:
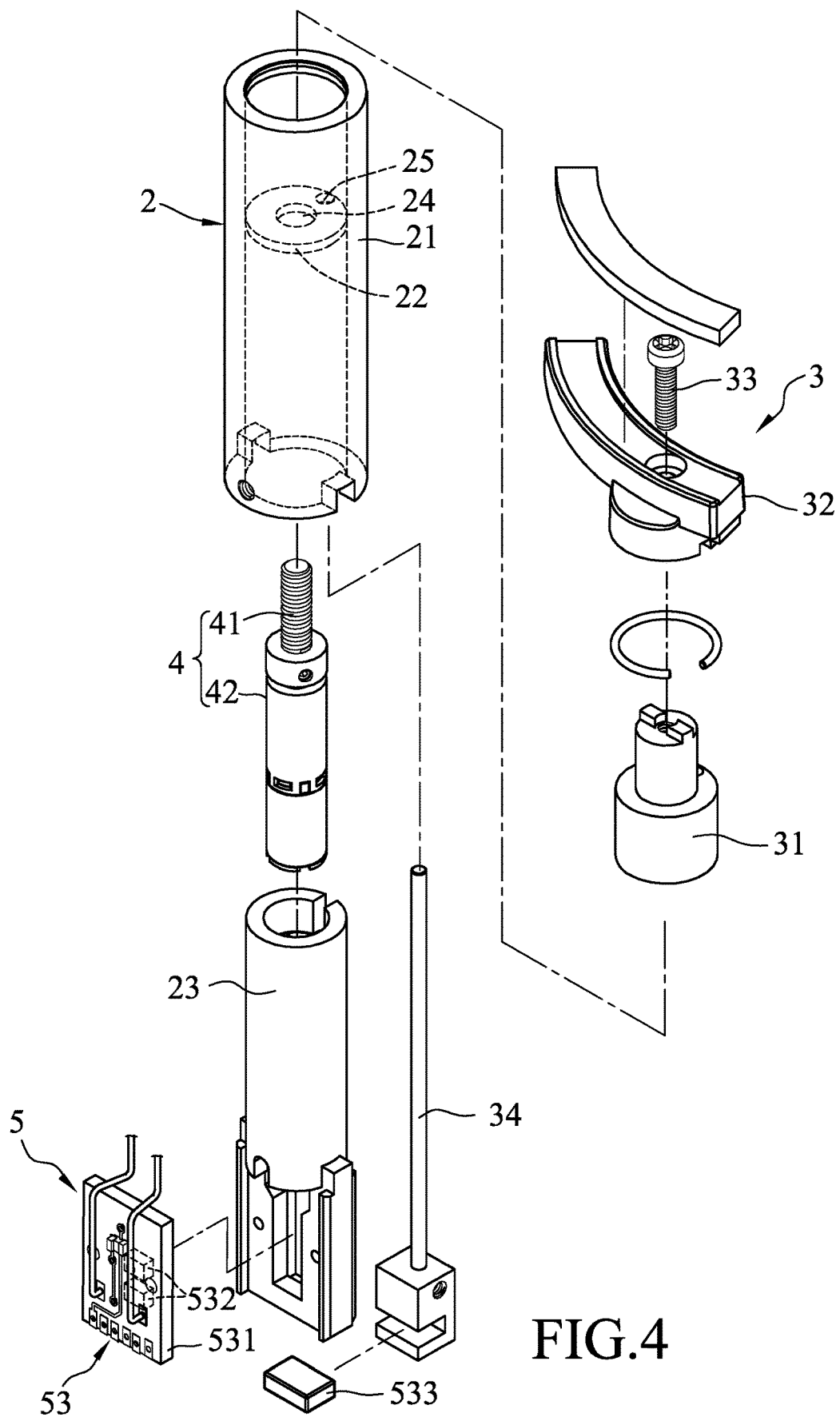
FIG. 4 is an exploded perspective view of the embodiment.

Referring to FIG. 1, an embodiment of an automatic tonearm lifter according to the disclosure is adapted for use in a turntable 1 that includes a main body 11 and a tonearm 12 rotatably mounted on the main body 11. The main body 11 includes a rotating platform 111 that is operable to drive rotation of a phonograph record disc (not shown). The tonearm 12 has a stylus needle (not shown) that is adapted for moving along a spiral groove of the record disc to read musical tracks thereon. Referring to FIGS. 2 and 4, the automatic tonearm lifter includes a casing 2, a lifting unit 3, a rotating unit 4, and a control unit 5.

Figure 5:
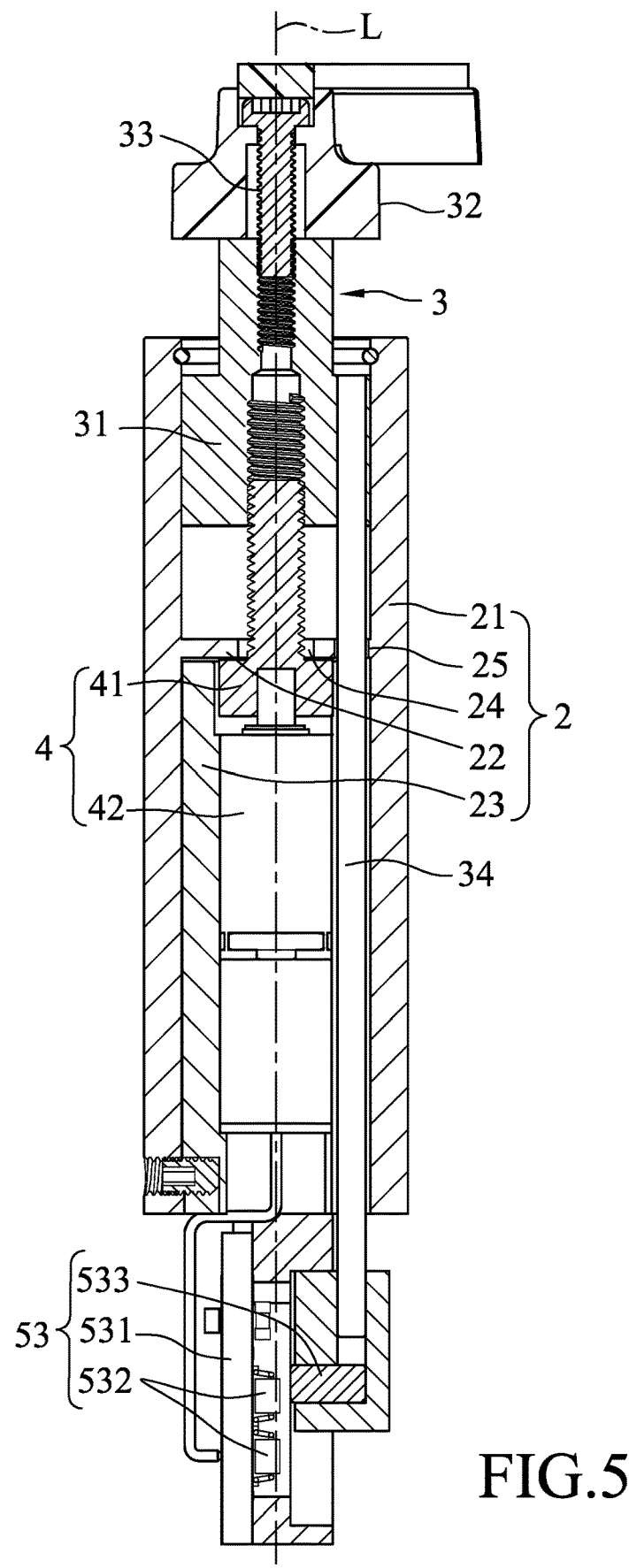
FIG. 5 is a sectional view of the embodiment when the lifting unit is at an upper bound of a predetermined range.

Referring to FIGS. 1, 4 and 5, the casing 2 is adapted to be fixedly mounted to the main body 11 of the turntable 1, and includes a tubular casing body 21 that extends along a vertical axis (L), an inner partition 22 that is mounted in the casing body 21, and a tubular casing support 23 that extends along the axis (L) and that is sleeved by the casing body 21. The inner partition 22 is formed with first and second through holes 24, 25 that are spaced apart from each other and that extend vertically through the inner partition 22. In this embodiment, the first through hole 24 extends along the axis (L) and is formed at a center of the inner partition 22, and the second through hole 25 is formed at a periphery of the inner partition 22.

Figure 6:
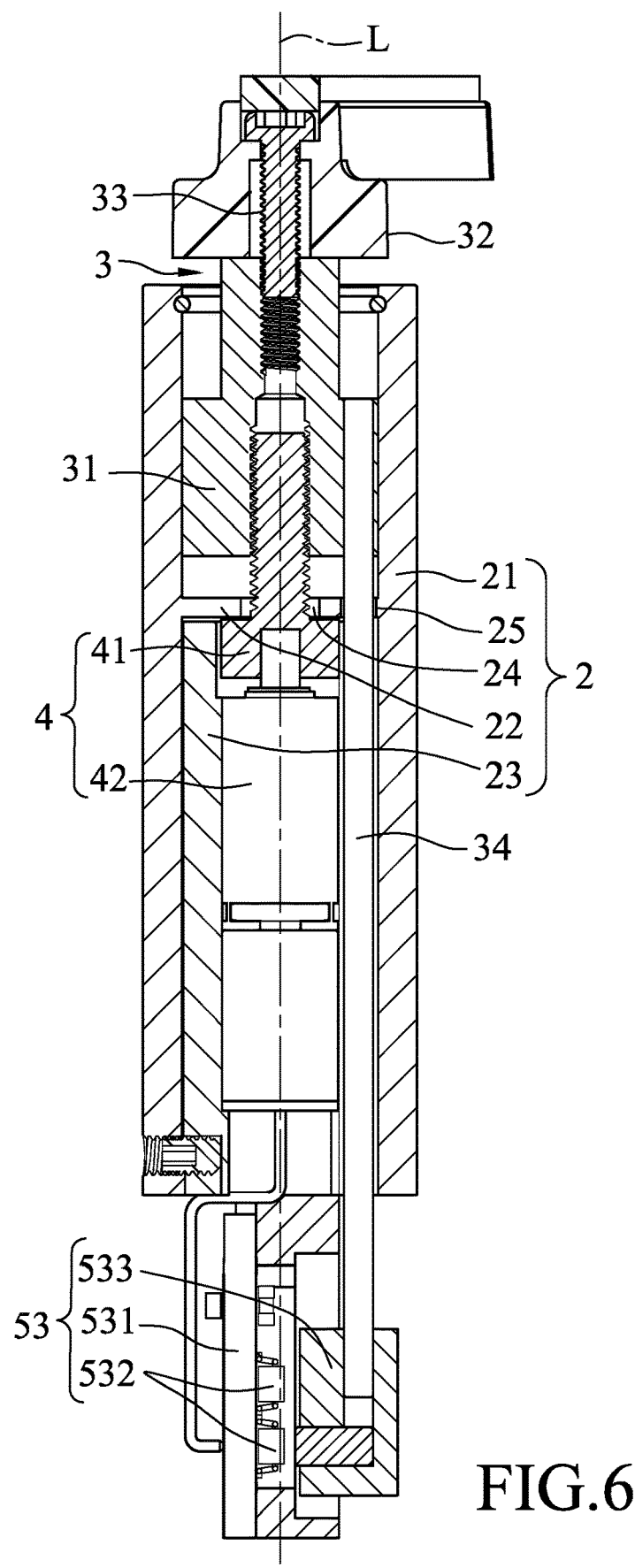
FIG. 6 is a sectional view of the embodiment when the lifting unit is at a lower bound of the predetermined range.

The lifting unit 3 is mounted to the casing 2, is adapted for supporting the tonearm 12, and is movable relative to the casing 2 along the axis (L) within a predetermined range, which has two opposite bounds: an upper bound (see FIG. 5) and a lower bound (see FIG. 6). The lifting unit 3 includes a tubular lifting seat 31 that is mounted to and extends upwardly from a top end of the casing 2 along the axis (L), a supporting frame 32 that is connected to a top end of the lifting seat 31 (via a bolt 33) and that is adapted for supporting the tonearm 12 of the turntable 1, and a blocking member 34 that is co-movably mounted to the lifting seat 31 and that extends vertically through a bottom end of the lifting seat 31 and the second through hole 25, such that the lifting seat 31 is non-rotatable about the axis (L) relative to the casing 2.

The rotating unit 4 includes a threaded seat 41 that is rotatable about the axis (L), that extends through the first through hole 24, and that is threadably engaged to the bottom end of the lifting seat 31 of the lifting unit 3, and a driving module 42 that is connected to a bottom end of the threaded seat 41, and that is sleeved by the casing support 23 of the casing 2. The driving module 42 is operable to drive rotation of the threaded seat 41, thereby moving the lifting seat 31 and the supporting frame 32 relative to the casing 2 along the axis (L). In this embodiment, the driving module 42 is a motor that is used to directly drive the rotation of the threaded seat 41. However, in other embodiments, the driving module 42 may be a combination of interconnected rotating gears and motors.

The control unit 5 is coupled to the driving module 42 of the rotating unit 4, and includes a control module 51 that is mounted in the main body 11 of the turntable 1, that is signally connected to the driving module 42, and that controls operation of the driving module 42, and a tonearm sensing module 52, a lifting unit sensing module 53, and an input module 54 that are all signally connected to the control module 51.

The tonearm sensing module 52 is mounted on the main body 11 of the turntable 1, and is adapted for sensing horizontal displacement of the tonearm 12 relative to the main body 11. When the tonearm sensing module 52 senses the tonearm 12 being moved to a predetermined position, it sends a tonearm sensing signal to the control module 51 to initiate operation of the driving module 42 of the rotating unit 4. In this embodiment, the predetermined position is the end position of the tonearm 12 when the stylus needle has reached the center of the record disc. The tonearm sensing module 52 may include photoelectric sensors, angle sensors, or the like.

The lifting unit sensing module 53 sends a lifting unit sensing signal to the control module 51 to stop operation of the driving module 42 when it senses displacement of the lifting unit 3 relative to the casing unit 2 beyond the predetermined range. Specifically, the lifting unit sensing module 53 includes a support plate 531 that is disposed below the driving module 42, that is mounted to the casing support 23 of the casing 2 (see FIG. 4), and that is signally connected to the control module 51, two first sensing members 532 that are spaced apart along the axis (L) and that are mounted to the support plate 531, and a second sensing member 533 that is mounted to a bottom end of the blocking member 34 of the lifting unit 3 distal from the lifting seat 31. The lifting unit sensing module 53 generates the lifting unit sensing signal when the second sensing member 533 senses presence of either one of the first sensing members 532. In this embodiment, each of the first sensing members 532 is a hall device, and the second sensing member 533 is a magnetic member that is permitted to change magnetic field around each of the first sensing members 532 to generate the lifting unit sensing signal. In other embodiments, each of the first sensing members 532 is a magnetic member, and the second sensing member is a hall device.

In a modification of the embodiment, the first sensing members 532 are mounted to an inner surrounding surface of the casing body 21 of the casing 2 facing the second sensing member 533, and the second sensing member 533 is mounted to an outer surface of the lifting seat 31 of the lifting unit 3 facing the first sensing members 532. In this modification, the lifting unit sensing module 53 also generate the lifting unit sensing signal when the second sensing member 533 senses presence of either one of the first sensing members 532.

In addition, in other modifications of the embodiment, the lifting unit sensing module 53 may utilize different displacement measuring techniques (i.e. photodetector, motion sensor) to sense displacement of the lifting unit 3 relative to the casing 2.

The input module 54 is mounted on the main body 11 of the turntable 1. When the input module 54 is operated by a user, the control module 51 controls the driving module 42 to move the lifting unit 3 away from one of the upper and lower bounds of the predetermined range to the other one of the upper and lower bounds.

In this embodiment, because the control module 51 is triggered by the tonearm sensing signal of the tonearm sensing module 52 of to control the driving module 42 to move the lifting unit 3 upwardly relative to the casing 2, the input module 54 of this embodiment may be simply designed in such a way that when it is operated, the control module 51 controls the driving module 42 to move the lifting unit 3 downwardly relative to the casing 2. The input module 54 may be configured as a pushbutton, a rotary button, a touch button, or the like.

Referring to FIGS. 1, 2, 5 and 6, during the operation of the turntable 1, after the rotating platform 111 has driven the record disc to rotate, the tonearm 12 is manually and horizontally moved along the supporting frame 32 of the lifting unit 3 such that the stylus needle of the tonearm 12 is disposed right above a periphery of the record disc. Then, by pressing the input module 54 of the embodiment, the control module 51 initiate the operation of the driving module 42 of the rotating unit 4, which drives rotation of the threaded seat 41 and the non-rotating and downward displacement of the lifting unit 3 relative to the casing 2, thereby lowering the stylus needle to be placed on the record disc for reading the musical tracks. During this time, when the second sensing member 533 of the lifting unit sensing module 53 and the lower one of the first sensing members 532 of the lifting unit sensing module 53 sense each other, the lifting unit sensing module 53 senses displacement of the lifting unit 3 relative to the casing unit 2 to be at the lower bound of the predetermined range, and sends a lifting unit sensing signal to the control module 51 to stop the operation of the driving module 42, thereby stopping movement of the lifting unit 3.

When the tonearm sensing module 52 senses the tonearm 12 to be at the end position, where the stylus needle thereof has moved to the center of the record disc and has reached the end of the musical tracks, it sends a tonearm sensing signal to the control module 51 to initiate operation of the driving module 42 of the rotating unit 4, which drives the lifting seat 31 and the supporting frame 32 to move upwardly relative to the casing 2 along the axis (L), thereby lifting the the tonearm 12. Then, when the second sensing member 533 of the lifting unit sensing module 53 and the upper one of the first sensing members 532 of the lifting unit sensing module 53 sense each other, the lifting unit sensing module 53 senses displacement of the lifting unit 3 relative to the casing unit 2 to be at the upper bound of the predetermined range, and sends a lifting unit sensing signal to the control module 51 to stop the operation of the driving module 42, thereby stopping movement of the lifting unit 3 again. At this time, the tonearm 12 has been lifted, and the stylus needle thereof is no longer in direct contact with the record disc. As such, the stylus needle would always be removed as soon as the music has finished playing.

Overall, the automatic tonearm lifter ensures that the tonearm 12 would be lifted upwardly automatically whenever the music tracks of the record disc has finished playing, thereby preventing damage to the record disc itself. In addition, in a variation of the design of the control unit 5, when the music tracks have stopped playing, the lifting unit 3 of the automatic tonearm lifter is operable to automatically move away from one of the upper and lower bounds of the predetermined range, so that the user doesn't need to manually lift the tonearm 12 at all.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. An automatic tonearm lifter adapted for use in a turntable, the turntable including a main body, and a tonearm that is rotatably mounted on the main body, said automatic tonearm lifter comprising:
    a casing that is adapted to be fixedly mounted to the main body of the turntable;
    a lifting unit that is mounted to said casing, that is adapted for supporting the tonearm, that is movable relative to said casing along a vertical axis, and that is non-rotatable about the axis relative to said casing; and
    a rotating unit that includes
        a threaded seat rotatable about the axis and threadably engaging said lifting unit, and
        a driving module connected to said threaded seat and being operable to drive rotation thereof, thereby moving said lifting unit along the axis.

2. The automatic tonearm lifter as claimed in claim 1, further comprising:
    a control unit that is coupled to said driving module of said rotating unit, that controls operation of said driving module, and that includes a control module signally connected to said driving module, and a lifting unit sensing module signally connected to said control module; and
    when said lifting unit sensing module senses displacement of said lifting unit relative to said casing beyond a predetermined range, said lifting unit sensing module sends a lifting unit sensing signal to said control module to stop operation of said driving module.

3. The automatic tonearm lifter as claimed in claim 2, wherein:
    said control unit further includes a tonearm sensing module that is signally connected to said control module, and that is adapted for sensing displacement of the tonearm of the turntable relative to the main body of the turntable; and
    said tonearm sensing module sends a tonearm sensing signal to said control module to initiate operation of said driving module of said rotating unit when it senses the tonearm being moved to a predetermined position.

4. The automatic tonearm lifter as claimed in claim 2, wherein:
    said lifting unit sensing module includes two first sensing members that are spaced apart along the axis, and a second sensing member that is mounted to said lifting unit; and
    said lifting unit sensing module generates the lifting unit sensing signal when said second sensing member senses presence of either one of said first sensing members.

5. The automatic tonearm lifter as claimed in claim 4, wherein:
    each of said first sensing members of said lifting unit sensing module is one of a magnetic member and a hall device that is signally connected to said control module, and said second sensing member is the other one of the hall device and the magnetic member.

6. The automatic tonearm lifter as claimed in claim 2, wherein:
    said control unit further includes an input module that is signally connected to said control module; and
    when said input module is operated, said control module controls said driving module of said rotating unit to move said lifting unit downwardly relative to said casing.

7. The automatic tonearm lifter as claimed in claim 2, wherein:
    said control unit further includes an input module that is signally connected to said control module; and
    when said input module is operated, said control module controls said driving module of said rotating unit to move said lifting unit away from one of two opposite bounds of the predetermined range.

8. The automatic tonearm lifter as claimed in claim 4, wherein:
    said control unit further includes an input module that is signally connected to said control module; and
    when said input module is operated, said control module controls said driving module of said rotating unit to move said lifting unit away from one of two opposite bounds of the predetermined range.

9. The automatic tonearm lifter as claimed in claim 1, wherein said lifting unit includes:
    a lifting seat that is threadably engaged with said rotating unit, and
    a supporting frame that is connected to said lifting seat and that is adapted for supporting the tonearm of the turntable.

10. The automatic tonearm lifter as claimed in claim 1, wherein said casing includes a casing body, and an inner partition that is mounted in said casing body and that is formed with a first through hole, said lifting unit including a lifting seat, said threaded seat extending through said first through hole of said inner partition to threadably engage said lifting seat.

11. The automatic tonearm lifter as claimed in claim 10, wherein said inner partition is further formed with a second through hole that is spaced apart from said first through hole, said lifting unit further including a blocking member that is co-movably mounted to said lifting seat and that extends through said second through hole of said inner partition, such that said lifting seat is non-rotatable about the axis relative to said casing.

12. The automatic tonearm lifter as claimed in claim 11, further comprising a control unit that includes a control module signally connected to said driving module, and a lifting unit sensing module signally connected to said control module, said lifting unit sensing module including two first sensing members that are spaced apart along the axis, and a second sensing member that is mounted to a bottom end of said blocking member distal from said lifting seat, said lifting unit sensing module generating a lifting unit sensing signal when said second sensing member senses presence of either one of said first sensing members.

\* \* \* \* \*